United States Patent
Park

(10) Patent No.: US 12,358,482 B2
(45) Date of Patent: Jul. 15, 2025

(54) APPARATUS AND METHOD FOR IMPROVING INITIAL RESPONSE THROUGH ELECTRO-MECHANICAL MOTOR FREQUENCY EXCITATION

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 110 days.

(21) Appl. No.: 18/377,766

(22) Filed: Oct. 6, 2023

(65) Prior Publication Data

US 2024/0367631 A1   Nov. 7, 2024

(30) Foreign Application Priority Data

May 4, 2023 (KR) .......................... 10-2023-0058242

(51) Int. Cl.
*B60T 13/74* (2006.01)
*B60T 7/04* (2006.01)

(52) U.S. Cl.
CPC ............ *B60T 13/741* (2013.01); *B60T 7/042* (2013.01); *B60T 2220/04* (2013.01)

(58) Field of Classification Search
CPC ..... B60T 13/741; B60T 2270/84; H02P 27/06
See application file for complete search history.

(56) References Cited

U.S. PATENT DOCUMENTS

| | | | | |
|---|---|---|---|---|
| 9,705,438 | B2* | 7/2017 | Zhao | H02P 21/26 |
| 11,233,467 | B2* | 1/2022 | Kadoya | H02P 6/17 |
| 2003/0125863 | A1* | 7/2003 | Tamasho | F16D 55/226 |
| | | | | 303/20 |
| 2008/0199160 | A1* | 8/2008 | Yamazaki | B62D 5/0469 |
| | | | | 388/815 |
| 2009/0192679 | A1* | 7/2009 | Kobayashi | B62D 5/0472 |
| | | | | 701/42 |
| 2014/0055077 | A1* | 2/2014 | Barrass | G05B 9/02 |
| | | | | 318/700 |
| 2015/0061336 | A1* | 3/2015 | Ku | A47C 7/029 |
| | | | | 297/283.1 |
| 2018/0043792 | A1* | 2/2018 | Sawada | B60W 30/18127 |
| 2021/0391812 | A1* | 12/2021 | Kuruppu | H02P 6/16 |
| 2022/0231624 | A1* | 7/2022 | Balamurali | H02P 6/08 |

* cited by examiner

*Primary Examiner* — Long T Tran
(74) *Attorney, Agent, or Firm* — WOMBLE BOND DICKINSON (US) LLP

(57) ABSTRACT

The present disclosure relates to an apparatus for improving initial response through electro-mechanical brake (EMB) motor frequency excitation, including a microcontroller including a motor proportional-integral (PI) controller, a gate driver, and an FET inverter, wherein the microcontroller is configured to generate a high frequency signal and a low frequency signal, generate an input dithering signal by combining the high frequency signal and the low frequency signal, transfer the input dithering signal to the motor PI controller, and transfer an output signal of the motor PI controller to the inverter circuit, and the motor is controlled based on an output signal from the inverter circuit.

20 Claims, 4 Drawing Sheets

APPARATUS AND METHOD FOR IMPROVING INITIAL RESPONSE THROUGH ELECTRO-MECHANICAL MOTOR FREQUENCY EXCITATION

CROSS-REFERENCE TO RELATED APPLICATION

This application claims priority under 35 U.S.C. § 119 to Korean Patent Application No. 10-2023-0058242, filed on May 4, 2023, in the Korean Intellectual Property Office (KIPO), the disclosure of which is incorporated by reference herein in its entirety.

TECHNICAL FIELD

The present disclosure relates to an apparatus and method for improving initial response through electro-mechanical brake (EMB) motor frequency excitation.

BACKGROUND

In a conventional hydraulic braking system, force required to stop a vehicle is generated by fluid pressure applied when a driver presses a brake pedal. Brake fluid flows through a brake lines into a brake caliper and tightens a brake rotors to produce friction necessary to slow or stop the vehicle.

On the other hand, a brake device using a motor generates rotational force through the motor to generate force necessary to stop the vehicle. This rotational force is transferred to a transmission medium such as a belt pulley or reducer gear, which then transfers the force to a brake system.

However, one of the major problems with the conventional motor-based brake system is that the response time may be slower than the hydraulic system. The reason is that while the motor first generates the rotational force and then the generated torque should be transferred to the next transmission medium, the belt pulley or reducer gear, if a force greater than the friction force is not applied between the motor and a mechanism connected to the motor, the actual force is not rapidly transferred to the braking device. This may delay the braking response time.

In a conventional braking device using hydraulic pressure, while an excitation frequency was applied to a solenoid valve to linearly drive the solenoid valve, there was a problem in that wear occurred at a single frequency or a specific frequency due to the use of only a single frequency or specific frequency signal.

In addition, in the case of an EMB using a motor, technologies for compensating frictional force of a mechanism in an upper controller, such as a drum EMB or a caliper EMB, are known.

The drum EMB is a braking technology that combines electromechanical operation with traditional drum brake design to achieve efficient and precise braking control in a variety of applications, and operates based on the principle of applying braking force through friction between a brake drum and a brake pad. This is a method in which an electric motor-driven actuator pushes the brake pad outward against the inner surface of a rotating drum connected to the wheel of the vehicle to obtain braking force by the frictional force generated between the brake pad and the drum surface. However, the drum EMB has a problem in that the frictional force of a double reducer connected to the motor and the last planetary gear lowers an initial driving speed.

The caliper EMB is a scheme in which an actuator applies pressure on both sides of the brake pad to a rotating disc connected to a tire like conventional caliper brakes, and the braking force is obtained by the frictional force between the disc and the brake pad. This braking method provides precise control, allowing for better modulation and responsiveness, but since the friction elements from the belt pulley and the secondary reducer connected thereafter to a shaft with a thrust bearing that pushes the actual caliper are various, there is a limit to obtaining a fast initial driving speed.

SUMMARY

As a means for solving the above-described technical problems, an apparatus for improving initial response through electro-mechanical brake (EMB) motor frequency excitation according to an aspect of the present disclosure includes: a microcontroller including a motor proportional-integral (PI) controller; an inverter circuit including a gate driver and an FET inverter; and a motor, wherein the microcontroller is configured to generate a high frequency signal and a low frequency signal, generate an input dithering signal by combining the high frequency signal and the low frequency signal, transfer the input dithering signal to the motor PI controller, and transfer an output signal of the motor PI controller to the inverter circuit, and wherein the motor is controlled based on an output signal from the inverter circuit.

In an example embodiment, each of the high frequency signal and the low frequency signal is a voltage or current.

In an example embodiment, the high frequency signal is of a magnitude that changes an output torque of the motor but does not cause a position change of a system.

In an example embodiment, the low frequency signal is of a magnitude enough to generate movement within a clearance of the motor, i.e., a magnitude at which a position change of the motor occurs but a position change of a system is within a system accuracy of system specifications.

In an example embodiment, each of the high frequency signal and the low frequency signal is a random frequency signal having a normal distribution.

In an example embodiment, the random frequency signal is in the form of a sine wave, and the sine wave includes a plurality of different frequency components.

In an example embodiment, a magnitude of the low frequency signal is adjusted to increase from a time when a driver starts to press a pedal to a time when an actual braking force is generated and to decrease to an initial state from the time when the braking force is generated.

In an example embodiment, the high frequency signal has a center frequency of 1 kHz and a bandwidth of 0.8 kHz to 1.2 kHz, and the low frequency signal has a center frequency of 100 Hz and a bandwidth of 70 Hz to 130 Hz. A value of the center frequency is changeable in consideration of resonance characteristics of the system.

A method for improving initial response through motor frequency excitation of an electro-mechanical brake (EMB) including a microcontroller, an inverter circuit, and a motor according to another aspect of the present disclosure includes generating a high frequency signal and a low frequency signal by the microcontroller, generating an input dithering signal by combining the high frequency signal and the low frequency signal and transferring the input dithering signal to the inverter circuit by the microcontroller, and controlling the motor based on an output signal of the inverter circuit In an example embodiment, each of the high frequency signal and the low frequency signal is a voltage or current.

In an example embodiment, the high frequency signal is of a magnitude that changes an output torque of the motor but does not cause a position change of a system.

In an example embodiment, the low frequency signal is of a magnitude enough to generate movement within a clearance of the motor, i.e., a magnitude at which a position change of the motor occurs but a position change of a system is within a system accuracy of system specifications.

In an example embodiment, each of the high frequency signal and the low frequency signal is a random frequency signal having a normal distribution.

In an example embodiment, the random frequency signal is in the form of a sine wave, and the sine wave includes a plurality of different frequency components.

In an example embodiment, a magnitude of the low frequency signal is adjusted to increase from a time when a driver starts to press a pedal to a time when an actual braking force is generated and to decrease to an initial state from the time when the braking force is generated.

In an example embodiment, the high frequency signal has a center frequency of 1 kHz and a bandwidth of 0.8 kHz to 1.2 kHz, and the low frequency signal has a center frequency of 100 Hz and a bandwidth of 70 Hz to 130 Hz.

A method of generating a dithering excitation frequency signal including a low frequency signal and a high frequency signal performed by a microcontroller according to another aspect of the present disclosure includes receiving initial values of magnitudes and frequencies of a high frequency signal and a low frequency signal having a predetermined gain K, respectively, determining whether a driver presses a brake pedal, when it is determined that the driver presses the brake pedal, determining whether a rotational speed of a motor is greater than an operating speed, and when it is determined that the rotational speed of the motor is greater than the operating speed, linearly increasing the magnitude of the low frequency signal until the magnitude of the low frequency signal reaches a final value to adjust the gain K, and when it is determined that the rotational speed of the motor is slower than the operating speed, determining a final magnitude and frequency of an input current or voltage by setting the gain K to a fixed value, and when it is determined that the driver does not press the brake pedal, setting initial magnitudes of the low frequency signal and the high frequency signal, generating an input current or an input voltage for the low frequency signal and the high frequency signal, wherein the input current or the input voltage is generated by applying a random frequency signal with a normal distribution, and determining a final magnitude and a frequency of the input current or the input voltage.

In an example embodiment, the determining of whether the driver presses the brake pedal includes determining that the driver presses the brake pedal when an angle of the brake pedal exceeds a critical angle and determining that the driver does not press the brake pedal when the angle of the brake pedal is less than the critical angle.

In an example embodiment, when the driver does not press the brake pedal, the initial magnitudes of the low frequency signal and the high frequency signal are set by determining a minimum excitation frequency to be of a magnitude that does not generate an actual braking force and maintaining the magnitude of the high frequency signal at a predetermined value.

In an example embodiment, the random frequency signal is in the form of a sine wave, and the sine wave includes a plurality of different frequency components.

According to the present disclosure, there is an effect of minimizing a braking response delay phenomenon that occurs in a process in which an initial force is transferred by frictional force between a motor and a mechanism.

In addition, according to the present disclosure, there is an effect of further increasing the responsiveness of the system by considering the state of the pedal and the braking device and alleviating the problem caused by the frictional force.

In addition, according to the present disclosure, by using a frequency with a random normal distribution, for noise, vibration, and harshness (NVH) or electromagnetic compatibility (EMC) problems, there is an effect of alleviating the excitation frequency input problem used by other existing devices to maintain optimal performance and stability.

DETAILED DESCRIPTION

Figure 1:
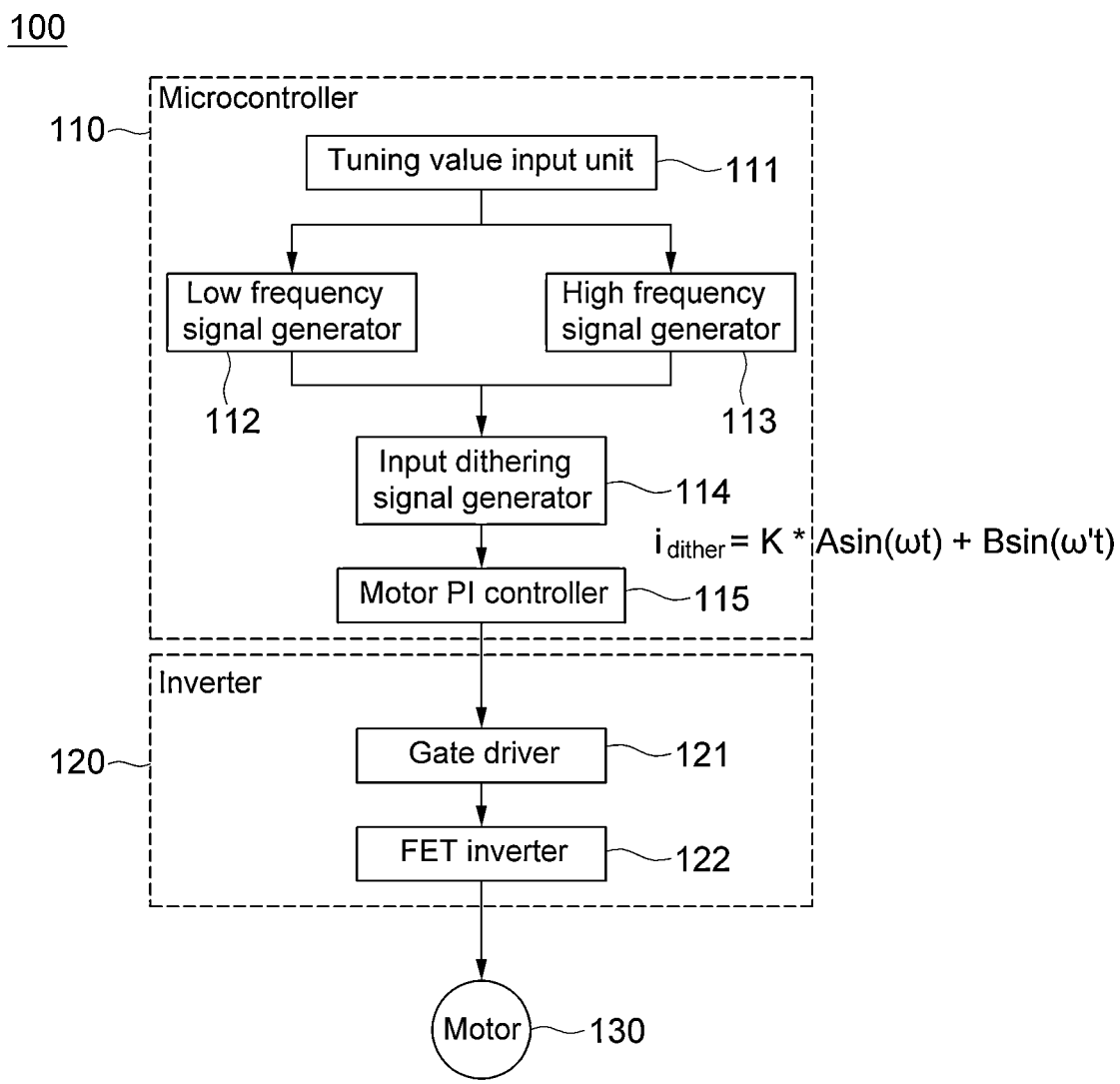
FIG. 1 is a block diagram illustrating a configuration of an apparatus for improving initial response through motor frequency excitation according to some example embodiments.

For the example embodiments of the present disclosure disclosed herein, specific structural or characteristic descriptions are merely exemplified for the purpose of explaining the example embodiments of the present disclosure, and the example embodiments of the present disclosure may be embodied in various forms and should not be construed as being limited to the example embodiments described herein.

In addition, the term '~ unit' described in the present specification means software or a hardware component such as a field-programmable gate array (FPGA) or ASIC, and a '~ unit' performs predetermined roles. However, the term '~ unit' is not limited to software or hardware. A '~ unit' may be configured to be in an addressable storage medium and may be configured to reproduce one or more processors. Therefore, as an example, the '~ unit' includes components such as software components, object-oriented software components, class components, and task components, processes, functions, properties, procedures, subroutines, segments of program code, drivers, firmware, microcode, circuitry, data structures and variables.

Hereinafter, with reference to the accompanying drawings, preferred example embodiments of the present disclosure will be described in detail. The same reference numerals are used for the same components in the drawings, and redundant descriptions of the same components are omitted.

FIG. 1 is a block diagram illustrating a configuration of an apparatus for improving initial response through motor frequency excitation according to some example embodiments.

Referring to FIG. 1, an apparatus 100 for improving initial response through motor frequency excitation includes an inverter 120 and a microcontroller 110 configured to apply a signal to the inverter. The microcontroller 110 generally includes a central processing unit (CPU), an input/output interface (I/O), an ADC, a memory, a communication interface, and the like. In addition, the microcontroller 110 used in the present disclosure may refer to a computing device, and may refer to a circuit device including an oscillator for generating a frequency signal, an amplifier for amplifying the signal generated by the oscillator, a filter for selecting or blocking a desired frequency band, and a control circuit for generating desired high frequency and low frequency signals by adjusting frequency, amplitude, and phase. In the present disclosure, operations of general components of the microcontroller 110 will be omitted, and functions of the microcontroller will be described focusing on the configuration of generating an input current or input voltage to a motor PI controller.

The microcontroller 110 illustrated in FIG. 1 may include a tuning value input unit 111, a low frequency signal generator 112, a high frequency signal generator 113, an input dithering signal generator 114, and a motor PI controller 115.

The tuning value input unit 111 receives a tuning value input from an external I/O for control of the inverter and a motor. This is used as a value for tuning a low frequency signal and a high frequency signal for the effect of improving the frictional force by excitation.

The low frequency signal generator 112, the high frequency signal generator 113, and the input dithering signal generator 114 may be used to generate a control signal input to the inverter.

More specifically, the low frequency signal generator 112 may generate a low frequency signal from tens of Hz to hundreds of Hz or less. As an example, the low frequency signal generator 112 generates a low frequency signal of 100 Hz or less, so that a minute force is actually generated in the motor, but no braking force is generated in the caliper or drum. The minute force that does not generate a braking force on the caliper or drum refers to the force that allows the motor to move within the clearance that the motor has. In general, the clearance a motor has refers to a range of about 1 degree to 2 degrees based on the rotational angle of the motor. In the case of a low frequency, it is desirable to set the basic value small because an output is generated in an actual motor or is easily transferred to a driver as a vibration element.

The high frequency signal generator 113 may generate a high frequency signal ranging from hundreds of Hz to several kHz or more. As an example, the high frequency signal generator 113 may generate a high frequency signal of 1 kHz or more and use it to warm up the motor PI controller without causing a change in an output system of the actual motor. Not causing a change in the output system of the actual motor refers to the degree to which the output torque of the motor is changed but the position change of the system is not caused. In general, high frequency may be more free from noise, vibration, and harshness (NVH) problems because the amount transferred to the driver from the outside of the vehicle is small.

A high frequency signal may have a bandwidth of several hundred Hz to several kHz, but this frequency band is not limited to the above example and may be determined according to the bandwidth of the controller. The bandwidth of the controller is an indicator of the maximum frequency range of the signal that the controller may process. The higher the bandwidth, the higher the frequency signal the controller may process. In general, the bandwidth of a motor PI controller is located between several hundred Hz and several kHz.

The low frequency signal generator 112 and the high frequency signal generator 113 may determine initial values of the magnitude and frequency of the low frequency signal and/or the high frequency signal based on the tuning value received from the tuning value input unit 111.

In the low frequency signal generator 112 and the high frequency signal generator 113, a random frequency with a normal distribution may be applied to each of the low frequency signal and the high frequency signal. The basically injected excitation wave may be a square wave, a triangular wave, a sine wave, or the like, but it is desirable to use a sine wave form that has the least influence on the outside. In addition, the sine wave may consist of a plurality of different frequency components, and each of the plurality of frequency components has a normal distribution form by having different magnitudes.

The magnitudes of the plurality of frequency components to form a normal distribution may be determined in consideration of noise, vibration, and harshness (NVH) characteristics and electromagnetic compatibility (EMC) characteristics. NVH characteristics relate to vehicle noise, vibration and harshness, while EMC characteristics relate to potential electromagnetic interference between frequency components and other electronic devices in and around the vehicle.

The input dithering signal generator 114 generates a dithering excitation frequency by combining a low frequency signal to which a random frequency signal is applied and a high frequency signal to which another random frequency signal is applied, and determines the current or voltage to be applied to the motor PI controller 115. The variables determined here are the magnitude and frequency of the low frequency signal and the magnitude and frequency of the high frequency signal, and the gain of the input current or voltage is determined.

The input dithering signal generator 114 adjusts the magnitude of the low frequency signal according to the pedal condition of the driver (e.g., whether the driver applies force to the pedal or the angle of the pedal to which force is applied) and the state of the brake system (e.g., the rotational speed of the motor). As an example embodiment, from the time at which the driver starts to press the pedal to the time at which the actual braking force is generated, the magnitude of the low frequency signal increases linearly or non-linearly, and from the time at which the braking force is generated, the magnitude of the low frequency signal may be adjusted to decrease to the initial state.

The low frequency signal and the high frequency signal whose magnitude is finally determined may be expressed as the following (Equation 1) as an input dithering signal, and the input dithering signal may be transferred to the motor PI controller 115.

$$i_{dither} = K * A \sin(\omega * t) + B \sin(\omega' * t) \quad \text{(Equation 1)}$$

Here, K refers to the gain, A refers to the magnitude of the low frequency signal, $\omega$ refers to the frequency of the low frequency signal, B refers to the magnitude of the high frequency signal, and $\omega'$ refers to the frequency of the high frequency signal.

In general, a PI controller accepts an error signal from a sensor that measures the error and uses this signal to adjust motor control. The controller first attempts to reduce the error using proportional control. However, since the error may not always be zero when only proportional control is used, the PI controller performs an additional correction to make the error zero using integral control. Integral control uses the integral of the error over time to generate a control signal, which is a control algorithm that ensures that the error is always zero.

The PI controller uses a combination of proportional control and integral control to accurately control the rotational speed of the motor, and through this, the electronic brake system may improve the safety of vehicle driving by providing a quick and accurate response to the driver's brake operation.

The motor PI controller 115 of FIG. 1 controls the rotational speed of the motor and serves to control the speed of the vehicle through this. The system works electronically to decelerate the vehicle when the brake pedal is pressed while driving the vehicle, and stops the vehicle when the brake pedal is released.

The motor PI controller 115 receives the input dithering signal from the input dithering signal generator 114 and controls the rotational speed of the motor. The controller measures the rotational speed of the motor from the sensor, calculates the error, and generates a control signal based on this. The control signal is transferred to the inverter 120.

The inverter 120 may include a gate driver 121 and an FET inverter 122. However, the configuration of the general inverter 120 may further include a power electronic device, a current sensor, a voltage sensor, a cooling system, and the like, but detailed descriptions of these components are omitted in the present specification.

The gate driver 121 of the present disclosure controls the operation of the FET inverter 122. The gate driver 121 controls the operation of the FET in the FET inverter 122 and regulates the voltage and current transferred to the motor 130 through this. This is necessary to control the rotational speed and torque of the motor 130.

Figure 2:
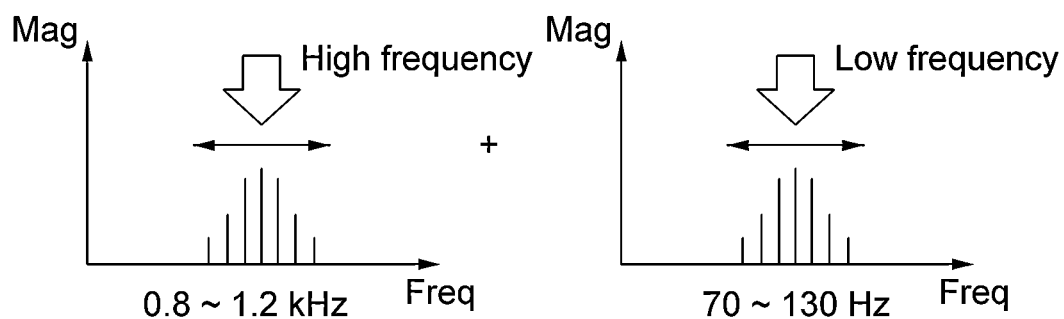
FIG. 2 is a diagram illustrating a high frequency signal and a low frequency signal to which a random frequency signal having a normal distribution is applied according to some example embodiments.

FIG. 2 is a diagram illustrating a high frequency signal and a low frequency signal to which a random frequency signal having a normal distribution is applied according to some example embodiments.

FIG. 2 shows that the high frequency signal is distributed from 0.8 kHz to 1.2 kHz, and the waveform of the high frequency signal is a sine wave having a normal distribution. The high frequency signal has a bandwidth of 0.8 kHz to 1.2 kHz, but is not limited thereto and may have a bandwidth of several hundred Hz to several kHz.

The sine wave of the high frequency band shown in FIG. 2 may include a plurality of frequencies, and each of the plurality of frequencies has a different magnitude to have a normal distribution. It shows that the sine wave of the high frequency band has the center frequency of 1 kHz and is distributed over 0.8 kHz to 1.2 kHz.

In the example of FIG. 2, the sine wave of the high frequency band of which center frequency is 1 kHz and which is distributed over 0.8 kHz to 1.2 kHz is exemplified, but may include more frequency components, and may also be transformed into a normally distributed sine wave with a wider bandwidth. In addition, the value of the center frequency may be changed in consideration of the resonance characteristics of the system. Similarly, the low frequency signal is distributed from 70 Hz to 130 Hz, and the waveform of the low frequency signal has a normal distribution. The sine wave of the low frequency band shown in FIG. 2 may include a plurality of frequencies, and each of these plurality of frequencies has a different magnitude, so that it has two different normal distribution forms. In addition, the value of the center frequency may be changed in consideration of the resonance characteristics of the system.

In the example of FIG. 2, the sine wave of the low frequency band of which center frequency is 100 Hz and which is distributed over 70 Hz to 130 Hz is exemplified, but may include more frequency components, and may also be transformed into a normally distributed sine wave with a wider bandwidth.

Magnitudes of the high frequency signal and the low frequency signal shown in FIG. 2 may be determined in consideration of noise, vibration, and harshness (NVH) characteristics and electromagnetic compatibility (EMC) characteristics. Determining the magnitude of these signals, in consideration of NVH and EMC characteristics, is critical to ensuring that a system or device is functioning correctly and is safe and reliable for its intended use. For example, excessive noise or vibration from machinery or vehicles may cause discomfort, fatigue or physical injury to drivers or passengers. In addition, electromagnetic interference may disrupt or damage electronic equipment or cause unintended consequences. Therefore, determining the magnitude of the high frequency signal and the low frequency signal based on NVH characteristics and EMC characteristics is an important consideration in system design.

Figure 3:
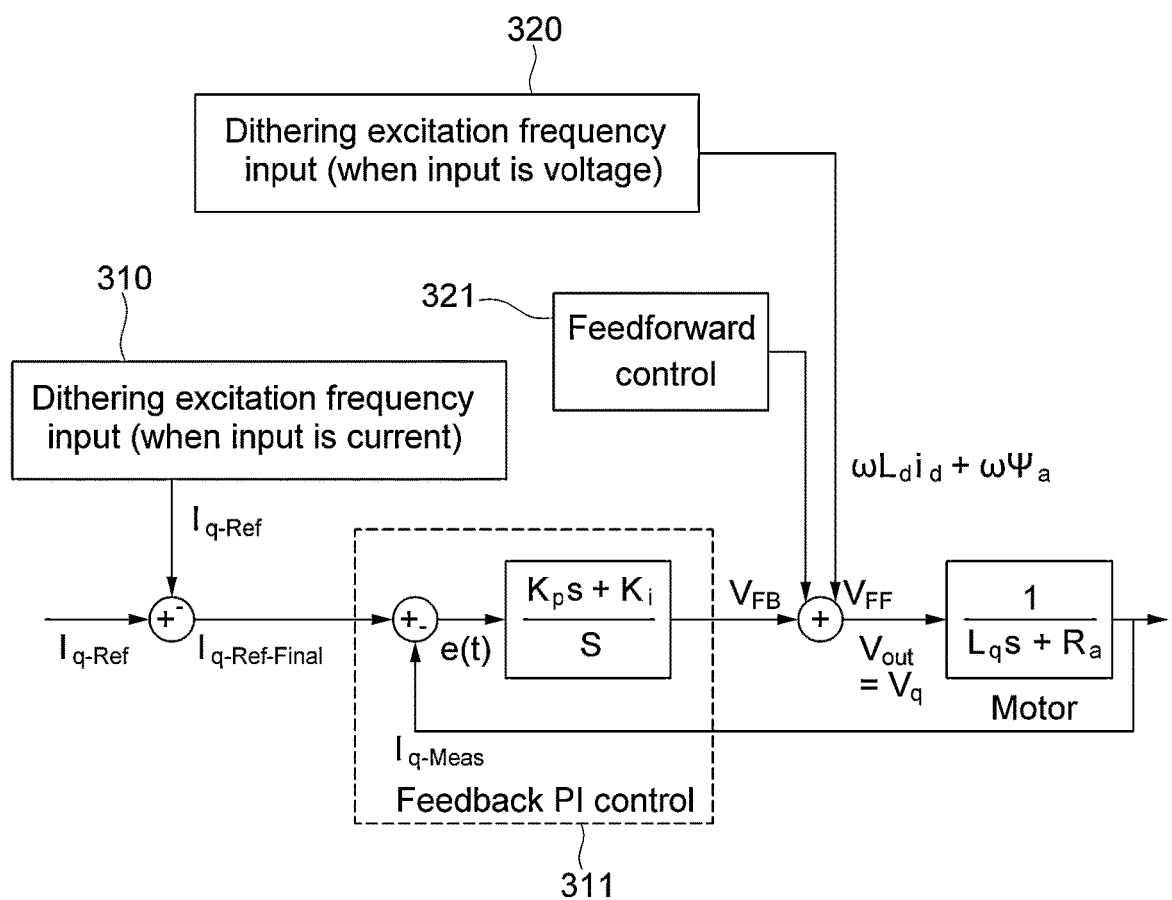
FIG. 3 is a diagram illustrating an example in which a frequency input is applied to a motor PI controller according to some example embodiments.

FIG. 3 is a diagram illustrating an example in which a frequency input is applied to a motor PI controller according to some example embodiments.

FIG. 3 shows that feedback PI control is used when the dithering excitation frequency signal is input to current, and feedforward PI control is used when the dithering excitation frequency signal is input to voltage.

Feedforward PI control and feedback PI control are two common types of control systems used to regulate and control the behavior of dynamic systems.

Feedback PI control is a type of control system that works by continuously monitoring the system's output and comparing it to a desired set value. The difference between the actual output and the set point is an error signal that is fed back to the controller. The controller then adjusts the input to the system based on the error signal to bring the output closer to the set point. The process continues in a feedback loop where the controller continuously adjusts the input to the system based on the error signal. The advantages of feedback PI control include the ability to handle disturbances of the system and the ability to maintain stable output in the face of changing conditions. Feedback PI control is commonly used in a wide range of applications including temperature control, motion control and process control.

On the other hand, feedforward PI control is a type of control system that works by predicting the effect of a disturbance on the system output and adjusting the input accordingly. Feedforward control uses a mathematical model of the system to calculate the required inputs to the system based on known disturbances. The input is then adjusted to compensate for the expected effect of the disturbance on the system output. The advantages of feedforward PI control include the ability to provide fast response to disturbances and the ability to reduce the effects of disturbances on the system output. Feedforward PI control is commonly used in applications where disturbances may be predicted, such as motor control.

FIG. 3 shows that feedback PI control is used when the dithering excitation frequency signal is current as an input, and/or feedforward PI control is used when the dithering excitation frequency signal is voltage as an input, wherein current and voltage may be respectively input according to the design range required by those skilled in the art, or both may be input simultaneously.

Figure 4:
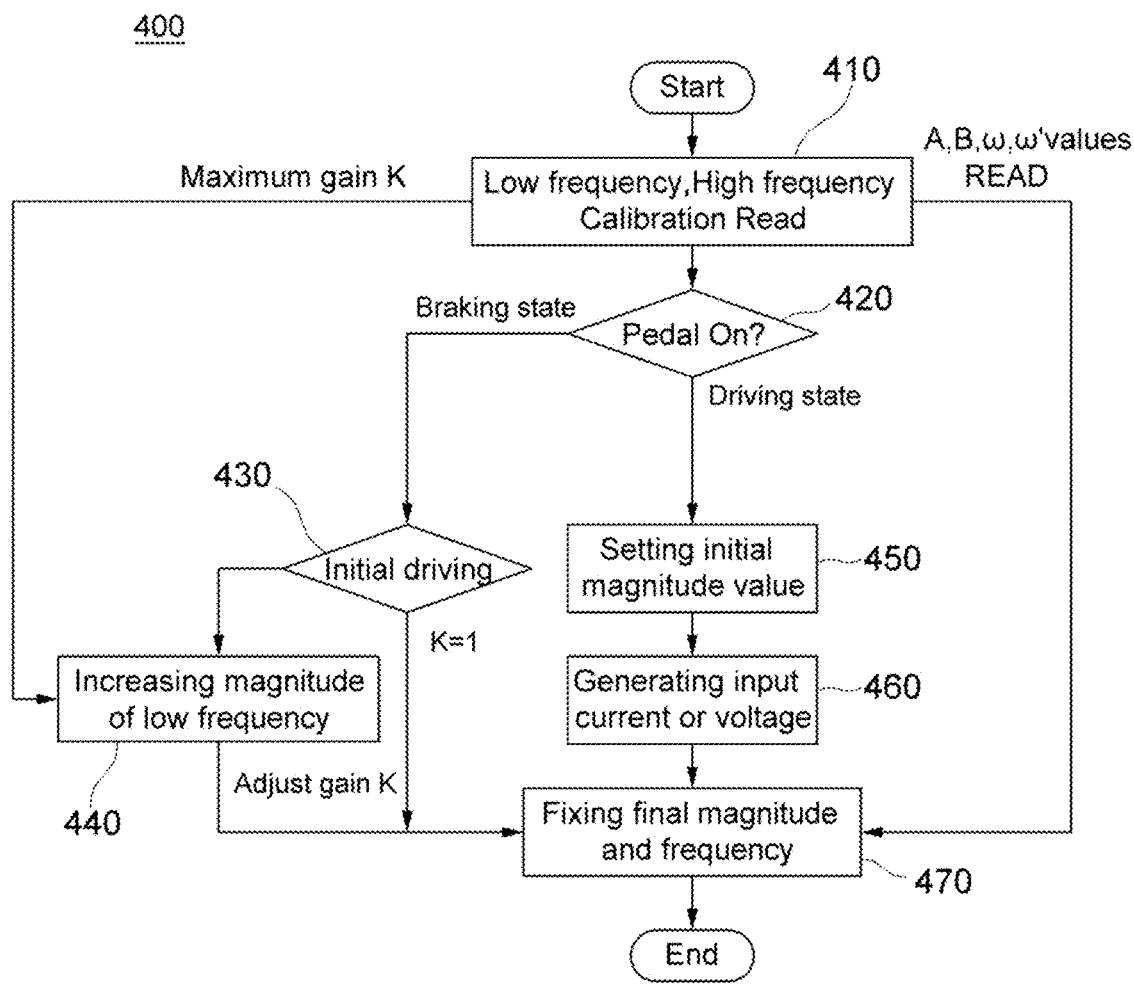
FIG. 4 is a flowchart illustrating a process of generating a dithering excitation frequency signal including a low frequency signal and a high frequency signal according to some example embodiments.

FIG. 4 is a flowchart illustrating a process of generating a dithering excitation frequency signal including a low frequency signal and a high frequency signal according to some example embodiments.

The generation of the dithering excitation frequency signal in FIG. 4 may be performed by a microprocessor, and the process of FIG. 4 will be described in detail below.

First, in operation 410, initial values of magnitudes and frequencies of a high frequency signal and a low frequency signal having a predetermined gain K are respectively received. Here, the low frequency signal has a magnitude A and a frequency ω and a maximum gain K, and the high frequency signal has a magnitude B and a frequency ω'. In receiving the initial values of the magnitudes and frequencies of the low frequency signal and the high frequency signal, respectively, the values may be received by input from an input device (not shown) or an external device.

Next, in operation 420, it is determined whether the driver presses the brake pedal. Although various methods may be used to determine whether the driver presses the brake pedal, it may be generally confirmed by checking the angle of the pedal or the rotational speed of the motor.

Checking the angle of the pedal measures the angle of the brake pedal that changes when the driver presses it with a sensor, and when the angle of the pedal exceeds a certain threshold value, the control system may determine that the driver presses the brake.

Another method is to check the rotational speed of the motor that controls the brake pedal. When the driver presses the pedal, the motor rotates and changes the rotational speed. The control system may determine whether the driver presses the brake by measuring the rotational speed of the motor.

In operation 420, when it is determined that the driver presses the brake pedal by checking the angle of the pedal, the processor determines the current state as a braking state.

In operation 430, when it is determined that the driver presses the brake pedal, it is determined whether the rotational speed of the motor is greater than the operating speed, and when the rotational speed of the motor is greater than the operating speed, the magnitude of the low frequency signal is linearly increased until the magnitude of the low frequency signal reaches a final value in order to adjust the gain K (operation 440). Here, the final value may refer to a value at a time when an actual braking force starts to occur. When it is determined that the rotational speed of the motor is slower than the operating speed, the gain K is set to a fixed value (e.g., K=1) to determine the final magnitude and frequency of the input current or voltage.

When it is determined that the driver does not press the brake pedal, the processor determines the current state as a driving state. When the current state is the driving state, initial magnitudes of the low frequency signal and the high frequency signal are set (operation 450).

The initial magnitude of the low frequency signal is determined so that the magnitude of the minimum excitation frequency is within a range in which no actual braking force occurs. In addition, the initial magnitude of the high frequency signal is maintained at a default set magnitude.

In operation 460, an input current or input voltage is generated for the low frequency signal and the high frequency signal, but the input current or input voltage is generated by applying a random frequency signal with a normal distribution. A square wave, a triangular wave, a sine wave, etc., may be used as an excitation waveform injected as a random frequency signal with a normal distribution, but it is preferable to use a sine wave form that has the least influence on the outside. The sine wave may include a plurality of different frequency components, and each of the plurality of frequency components may have a normal distribution form by having different magnitudes.

The magnitude of the plurality of frequency components to form a normal distribution may be determined in consideration of NVH characteristics and EMC characteristics. Here, the low frequency component of the input current may be represented as A sin (ω*t), and the high frequency component may be represented as B sin (ω'*t).

In operation 470, according to the driver's pedal condition (e.g., whether the driver is applying force to the pedal or the angle of the pedal at which force is applied) and the state of the braking device (e.g., rotational speed of the motor), a random frequency within the high and low frequency ranges is set, and by finally determining the final magnitude of the low frequency signal following a normal distribution within the applied frequency, the dithering excitation frequency signal may be determined by the following (Equation 2).

$$i_{dither} = K * A \sin(\omega * t) + B \sin(\omega' * t) \qquad \text{(Equation 2)}$$

Here, K denotes gain, A denotes the magnitude of the low frequency signal, ω denotes the frequency of the low frequency signal, B denotes the magnitude of the high frequency signal, and ω' denotes the frequency of the high frequency signal.

The low frequency signal and the high frequency signal, whose magnitudes are finally determined may be used in various applications as input dithering signals according to Equation 2 above. For example, the input dithering signal whose final magnitude and frequency are determined may be transferred to the motor PI controller 115 or the inverter 120 of FIG. 1. The signal transferred to the motor PI controller 115 or the inverter 120 may operate as described in FIG. 1, but is not limited thereto and may be applied according to various modifications of those skilled in the art.

Although the example embodiments have been described in detail above, the scope of rights according to the present disclosure is not limited thereto, and various modifications and improvements made by those skilled in the art using the basic concept of the present disclosure described in the appended claims are also included in the scope of the present disclosure.

What is claimed is:

1. An apparatus for improving initial response through electro-mechanical brake (EMB) motor frequency excitation, the apparatus comprising:
   a microcontroller comprising a motor proportional-integral (PI) controller;
   an inverter circuit comprising a gate driver and an FET inverter; and
   a motor,
   wherein the microcontroller is configured to:
   generate a high frequency signal and a low frequency signal;
   generate an input dithering signal by combining the high frequency signal and the low frequency signal;
   transfer the input dithering signal to the motor PI controller; and
   transfer an output signal of the motor PI controller to the inverter circuit, and wherein the motor is controlled based on an output signal from the inverter circuit.

2. The apparatus of claim 1, wherein each of the high frequency signal and the low frequency signal is a voltage or current.

3. The apparatus of claim 1, wherein the high frequency signal is of a magnitude that changes an output torque of the motor but does not cause a position change of a system.

4. The apparatus of claim 1, wherein the low frequency signal is of a magnitude at which a position change of the motor occurs but a position change of a system is within a system accuracy of system specifications.

5. The apparatus of claim 1, wherein each of the high frequency signal and the low frequency signal is a random frequency signal having a normal distribution.

6. The apparatus of claim 5, wherein the random frequency signal is in the form of a sine wave, and the sine wave comprises a plurality of different frequency components.

7. The apparatus of claim 6, wherein a magnitude of the low frequency signal is adjusted to increase from a time when a driver starts to press a pedal to a time when an actual braking force is generated and to decrease to an initial state from the time when the braking force is generated.

8. The apparatus of claim 5, wherein the high frequency signal has a center frequency of 1 kHz and a bandwidth of 0.8 kHz to 1.2 kHz, and the low frequency signal has a center frequency of 100 Hz and a bandwidth of 70 Hz to 130 Hz.

9. A method for improving initial response through motor frequency excitation of an electro-mechanical brake (EMB) comprising a microcontroller, an inverter circuit, and a motor, the method comprising:
generating a high frequency signal and a low frequency signal by the microcontroller;
generating an input dithering signal by combining the high frequency signal and the low frequency signal and transferring the input dithering signal to the inverter circuit by the microcontroller; and
controlling the motor based on an output signal of the inverter circuit.

10. The method of claim 9, wherein each of the high frequency signal and the low frequency signal is a voltage or current.

11. The method of claim 9, wherein the high frequency signal is of a magnitude that changes an output torque of the motor but does not cause a position change of a system.

12. The method of claim 9, wherein the low frequency signal is of a magnitude at which a position change of the motor occurs but a position change of a system is within a system accuracy of system specifications.

13. The method of claim 9, wherein each of the high frequency signal and the low frequency signal is a random frequency signal having a normal distribution.

14. The method of claim 13, wherein the random frequency signal is in the form of a sine wave, and the sine wave comprises a plurality of different frequency components.

15. The method of claim 14, wherein a magnitude of the low frequency signal is adjusted to increase from a time when a driver starts to press a pedal to a time when an actual braking force is generated and to decrease to an initial state from the time when the braking force is generated.

16. The method of claim 9, wherein the high frequency signal has a center frequency of 1 kHz and a bandwidth of 0.8 kHz to 1.2 kHz, and the low frequency signal has a center frequency of 100 Hz and a bandwidth of 70 Hz to 130 Hz.

17. A method of generating a dithering excitation frequency signal comprising a low frequency signal and a high frequency signal performed by a microcontroller, the method comprising:
receiving initial values of magnitudes and frequencies of a high frequency signal and a low frequency signal having a predetermined gain K, respectively;
determining whether a driver presses a brake pedal;
when it is determined that the driver presses the brake pedal, determining whether a rotational speed of a motor is greater than an operating speed, and
when it is determined that the rotational speed of the motor is greater than the operating speed, linearly increasing the magnitude of the low frequency signal until the magnitude of the low frequency signal reaches a final value to adjust the gain K, and
when it is determined that the rotational speed of the motor is slower than the operating speed, determining a final magnitude and frequency of an input current or voltage by setting the gain K to a fixed value, and
when it is determined that the driver does not press the brake pedal,
setting initial magnitudes of the low frequency signal and the high frequency signal;
generating an input current or an input voltage for the low frequency signal and the high frequency signal, wherein the input current or the input voltage is generated by applying a random frequency signal with a normal distribution; and
determining a final magnitude and a frequency of the input current or the input voltage.

18. The method of claim 17, wherein the determining of whether the driver presses the brake pedal comprises determining that the driver presses the brake pedal when an angle of the brake pedal exceeds a critical angle, and
determining that the driver does not press the brake pedal when the angle of the brake pedal is less than the critical angle.

19. The method of claim 18, wherein, when the driver does not press the brake pedal, the initial magnitudes of the low frequency signal and the high frequency signal are set by determining a minimum excitation frequency to be of a magnitude that does not generate an actual braking force and maintaining the magnitude of the high frequency signal at a predetermined value.

20. The method of claim 17, wherein the random frequency signal is in the form of a sine wave, and the sine wave comprises a plurality of different frequency components.

* * * * *